April 11, 1961  S. DUINKER  2,979,696
DEVICE FOR REGISTERING CODED INFORMATION
Filed June 16, 1954

INVENTOR
SIMON DUINKER

BY
AGENT

United States Patent Office 2,979,696
Patented Apr. 11, 1961

2,979,696

DEVICE FOR REGISTERING CODED INFORMATION

Simon Duinker, Eindhoven, Netherlands, assignor, by mesne assignments, to North American Philips Company, Inc., New York, N.Y., a corporation of Delaware Filed June 16, 1954, Ser. No. 437,220

Claims priority, application Netherlands July 3, 1953

1 Claim. (Cl. 340—173.2)

This invention relates to devices for registering coded information with the use of at least one statical dielectric trigger comprising a capacitor having a dielectric of high remanence, the information being determined by the condition of remanence of the dielectric.

It is known, in analogy with statical magnetic triggers, to utilise the two remanence conditions of capacitors which are non-linear and exhibit hysteresis in memory circuits for registering information in, for example, binary code.

By supplying a voltage pulse to such a capacitor it is possible to adjust a determined condition of remanence corresponding to "0" or "1" of the coded information, for example an "0" being characterized by a positive remanence and a "1" being characterized by a negative remanence. The condition of remanence of the capacitor may be determined again with the use of another voltage pulse, in other words the information may then be read.

However, the discrimination between the two conditions of remanence is more difficult as the hysteresis loop of the dielectric material being used is less rectangular. Monocrystals of suitable ferro-electric material, for example barium-strontium titanate, are preferable in this respect, but have the disadvantage that they are difficult to manufacture and also difficult to reproduce more particularly as far as dimensions are concerned. On the other hand, the hysteresis loop of polycrystalline materials which can be manufactured and exactly proportioned in a considerably simpler manner is materially inferior.

The object of the invention is to permit the use of materials having comparatively bad characteristic curves and it is characterized in that the capacitor comprising the dielectric of high remanence, together with another capacitor, is included in a circuit in which an impedance coupled to the two capacitors has built up across it a difference signal under the action of pulses of suitable polarities and strength supplied simultaneously to the two capacitors, which difference signal is substantially zero if the first-mentioned capacitor is in one of the two possible conditions of remanence.

Figure 1:
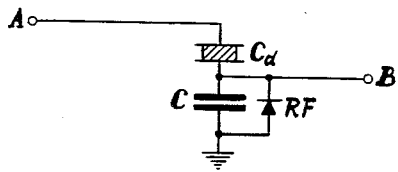
Figure 2:
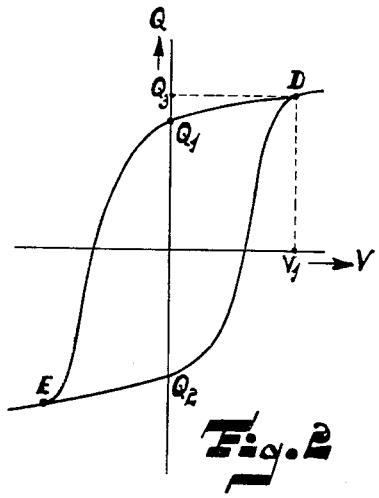
Figure 3:
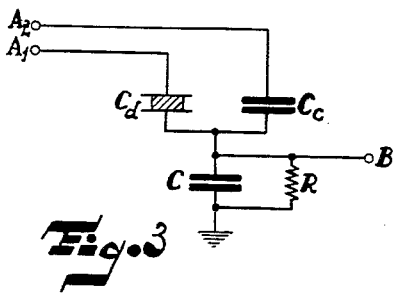
Figure 5:
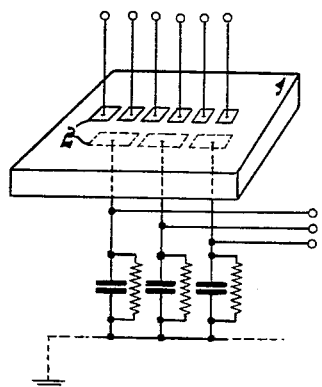
Figure 4:
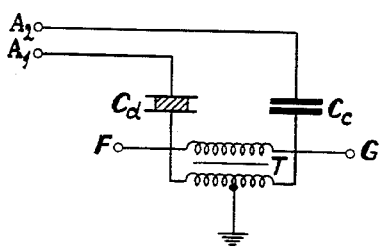

In order that the invention may be readily carried into effect, it will now be described with reference to the accompanying drawing, given by way of example, in which Fig. 1 shows a device of known type, Fig. 2 shows a curve such as occurs in such a device, Figs. 3 and 4 show devices according to the invention, and Fig. 5 shows a construction as may be used in a device according to the invention.

Fig. 1 shows a known device for registering coded information with the use of a statical dielectric trigger. In this figure $C_d$ indicates the capacitor comprising the dielectric of high remanence, C indicates an output impedance and RF indicates a rectifier.

Fig. 2 shows the polarisation curve of capacitor $C_d$ in which the charge Q is plotted as a function of the voltage v. If $V=0$, there are two conditions of remanence, that is to say the polarisation condition $Q_1$ and the polarisation condition $Q_2$. Assume now that the condition $Q_1$ corresponds to an "0" of the coded information and $Q_2$ to a "1." When the trigger is assumed to be in the condition $Q_1$, a positive pulse supplied to terminal A experiences the capacity of $C_d$ as $$\frac{dQ}{dV}$$

along the path $Q_1D$ and hence approximately as $(Q_3-Q_1)/V_1$.

If the capacity of C is high with respect to $$\left(\frac{dQ}{dV}\right)_{Q_1D}$$

then under the action of the positive pulse supplied to A the voltage set up across C, which is likewise pulsatory, and hence the voltage at the terminal B is small. However, if the trigger is in the situation $Q_2$, a strong voltage pulse occurs across C under the action of a positive reading pulse, since the capacity of $C_d$ is high along the path $Q_2D$, that is to say approximately $$(Q_3-Q_2)/V_1$$

Assuming the capacity of C to be low with respect to $$\frac{dQ}{dV}$$

through the path $Q_2D$, then $$\left(\frac{dQ}{dV}\right)_{Q_1D} < C < \left(\frac{dQ}{dV}\right)_{Q_2D}$$

If, furthermore, the reading pulse is chosen to be stronger than $V_1$ (see Fig. 2) the trigger furthermore returns to the condition $Q_1$, in other words again assumes the information "0," provided that C can discharge via the blocking impedance of RF within a time shorter than the duration of the pulse.

The determination of a memory element "1," which means that the trigger is caused to assume the condition $Q_2$, is effected by supplying to terminal A a negative voltage pulse having an absolute value higher than $V_1$, which voltage pulse brings the trigger via the point E into the condition $Q_2$. The rectifier RF ensures that the point B remains at earth potential as much as possible.

The discrimination between a "1" and an "0" is thus based on the difference between $$\left(\frac{dQ}{dV}\right)_{Q_1D} \text{ and } \left(\frac{dQ}{dV}\right)_{Q_2D}$$

This difference commonly appears to be comparatively small in practice, which becomes manifest in a comparatively small difference in strentgh between the pulse across across terminal B, when a "1" is determined, and the pulse across terminal B when an "0" is determined. The fact that this difference is so small is attributable to the hysteresis loop of the conventional dielectric being insufficiently rectangular, which renders proper discrimination between an "0" and a "1" difficult, more particularly in the case of polycrystalline materials.

Fig. 3 shows a device according to the invention. Assume the capacity of $C_c$ to be equal to $$\left(\frac{dQ}{dV}\right)_{Q_1D}$$

If the trigger thus is in the condition "0" and if a positive voltage pulse is supplied to the point $A_1$ and a negative voltage pulse of the same strength is supplied simultaneously to the point $A_2$, the voltages across $C_d$ and $C_c$, since $$C_c = \left(\frac{dQ}{dV}\right)_{Q_1 D}$$

are of equal values, but of opposite polarities, the resulting voltage across C being zero.

Strictly speaking, $C_c$ for this purpose need not be equal to $$\left(\frac{dQ}{dV}\right)_{Q_1 D}$$

but the voltage pulse supplied to $A_2$ must then naturally be chosen different from that supplied to $A_1$. If $$C_c = a \cdot \left(\frac{dQ}{dV}\right)_{Q_1 D}$$

where $a$ represents a constant, the voltage pulse supplied to $A_2$ must be $$\frac{1}{a} \frac{a\left(\frac{dQ}{dV}\right)_{Q_1 D} + C}{\left(\frac{dQ}{dV}\right)_{Q_1 D} + C}$$

times stronger than the voltage pulse supplied to $A_1$.

If, however, the trigger is in the condition $Q_2$, the capacity experienced by the positive pulse supplied to $A_1$ is $$\left(\frac{dQ}{dV}\right)_{Q_2 D}$$

instead of $$\left(\frac{dQ}{dV}\right)_{Q_1 D}$$

so that a resulting voltage occurs across C. The determination as to whether the trigger is in the condition $Q_1$ or $Q_2$ is now reduced to the observation whether a pulse across the terminal B occurs or does not occur, this in contradistinction to the method followed in the device shown in Fig. 1, in which the values of the pulses set up across B are to be measured.

It is to be noted that in Fig. 3 the rectifier RF is replaced by a resistor R, since in this case the impedance of the combination RC is the same for both the positive pulse supplied to $A_1$ and the negative pulse supplied to $A_2$. However, if in view of the registration the use of a rectifier is preferred, which is by no means necessary, this has to be taken into consideration for the values of the pulses supplied to $A_1$ and $A_2$.

It will be evident that the invention is not limited to a circuit of the kind shown in Fig. 3. Fig. 4 shows another embodiment in which $C_d$ and $C_c$ are interconnected via the primary winding of a transformer T, which winding is connected to earth via a centre tapping. In this case positive pulses must be supplied to both $A_1$ and $A_2$ for reading the information. If, as before, $C_d$ is in the condition $Q_1$ and if $$C_c = \left(\frac{dQ}{dV}\right)_{Q_1 D}$$

and the values of the two pulses are equal, a voltage pulse does not occur across the secondary winding at the terminals F and G, this in contradistinction to the case in which $C_d$ is in the condition $Q_2$. In this case also $C_c$ need not be equal to $$\left(\frac{dQ}{dV}\right)_{Q_1 D}$$

but the pulses must then be chosen of different values or the primary winding must be earthed asymmetrically.

The simplest way to ensure that $C_c$ is equal to $$\left(\frac{dQ}{dV}\right)_{Q_1 D}$$

and this through the whole portion of the path $Q_1 D$ controlled by the pulse supplied to $A_2$, whereby in many cases the pulses supplied to $A_1$ and $A_2$ may be chosen of equal values, consists in utilising for $C_c$ a capacitor identical with $C_d$. If $C_c$ is operated with negative pulses as in the device shown in Fig. 3, $C_c$ is adjusted in the condition $Q_2$. The control is then invariably effected through the path $Q_2 E$, in which event there must naturally apply $$\left(\frac{dQ}{dV}\right)_{Q_2 E} \cong \left(\frac{dQ}{dV}\right)_{Q_1 D}$$

However, if $C_c$ is operated with positive reading pulses, $C_c$ is adjusted in the condition $Q_1$ and controlled through the path $Q_1 D$.

If it is desired to utilise two identical capacitors $C_d$ and $C_c$, it is preferable that their electrodes should be provided on the same dielectric material, as the case may be, with one common electrode, as is possible in the circuit of Fig. 3, since the two polarisation curves then are identical as much as possible, apart of course from local inhomogeneities, if any, in the dielectric material.

If there are a plurality of such pairs of associated capacitors, the electrodes of these pairs of capacitors may alternatively be provided on a dielectric which is common to all pairs in a manner as shown diagrammatically in Fig. 5. In this figure reference numeral 1 indicates the dielectric material and 2 indicates the electrodes of the capacitors. The pairs of capacitors are included in circuits as shown in Fig. 3. It is thus possible to use one common electrode for each pair of capacitors.

What is claimed is:

A device for registering coded information, comprising a first capacitor having a dielectric of high remanence and having two possible conditions of remanence, a second capacitor, a difference-signal impedance member coupled to an electrode of each of said capacitors, means for applying electrical pulses simultaneously in parallel to the remaining electrodes of said capacitors whereby a difference signal produced in said impedance member in response to said pulses has a value of zero if said first capacitor is in one of said conditions of remanence and has a finite value if said first capacitor is in the other of said conditions of remanence, and means connected to said impedance member to derive said difference signal therefrom, said impedance member comprising a transformer winding, the ends of said winding being connected respectively to the first-named electrodes of said capacitors.

References Cited in the file of this patent
UNITED STATES PATENTS 2,695,396    Anderson    Nov. 23, 1954
2,695,993    Haynes    Nov. 30, 1954

OTHER REFERENCES

Electrical Engineering, pp. 916–22, October 1952.